US012585033B2

(12) United States Patent
Sin et al.

(10) Patent No.:     US 12,585,033 B2
(45) Date of Patent:          Mar. 24, 2026

(54) X-ray DETECTOR

(71) Applicants: RAYENCE Co., Ltd., Gyeonggi-do (KR); VATECH EWOO Holdings Co., Ltd., Gyeonggi-do (KR)

(72) Inventors: Dong Gi Sin, Gyeonggi-do (KR); Nam Hyeong Kim, Gyeonggi-do (KR); Sung Hoon Choi, Gyeonggi-do (KR)

(73) Assignees: RAYENCE Co., Ltd., Gyeonggi-do (KR); VATECH EWOO Holdings Co., Ltd., Gyeonggi-do (KR)

( * ) Notice: Subject to any disclaimer, the term of this patent is extended or adjusted under 35 U.S.C. 154(b) by 170 days.

(21) Appl. No.: 18/723,518

(22) PCT Filed: Dec. 23, 2022

(86) PCT No.: PCT/KR2022/021188
§ 371 (c)(1),
(2) Date: Jun. 24, 2024

(87) PCT Pub. No.: WO2023/121391
PCT Pub. Date: Jun. 29, 2023

(65) Prior Publication Data
US 2025/0085444 A1      Mar. 13, 2025

(30) Foreign Application Priority Data
Dec. 24, 2021     (KR) ........................ 10-2021-0187564

(51) Int. Cl.
*G01T 1/00*          (2006.01)
*G01T 1/20*          (2006.01)

(52) U.S. Cl.
CPC ...... *G01T 1/20184* (2020.05); *G01T 1/20182* (2020.05)

(58) Field of Classification Search
CPC .......... A61B 6/548; A61B 6/563; A61B 6/566
See application file for complete search history.

(56) References Cited

U.S. PATENT DOCUMENTS

| | | | |
|---|---|---|---|
| 2010/0072379 A1 | 3/2010 | Nishino et al. | |
| 2018/0275292 A1* | 9/2018 | Akamatsu | ............... G01T 1/362 |
| 2020/0064501 A1* | 2/2020 | Jadrich | ................. G01T 1/2002 |
| 2021/0358995 A1 | 11/2021 | Fujita et al. | |

FOREIGN PATENT DOCUMENTS

| | | | |
|---|---|---|---|
| JP | 2010-078415 A | 4/2010 | |
| JP | 2011-075327 A | 4/2011 | |
| JP | 2018-157942 A | 10/2018 | |
| JP | 2021-179396 A | 11/2021 | |
| KR | 10-2021-0081147 A | 7/2021 | |

\* cited by examiner

*Primary Examiner* — Dani Fox
(74) *Attorney, Agent, or Firm* — IP Legal Services, LLC

(57) ABSTRACT

The present invention provides an X-ray detector comprising: a sensor panel which has flexibility; at least one first flexible circuit unit which is attached along a first edge of the sensor panel and has a gate IC mounted therein; at least one second flexible circuit unit which is attached along a second edge of the sensor panel and has a readout IC mounted therein; a third flexible circuit unit which is attached to one end of the first edge; and a main circuit unit which is connected to the third flexible circuit unit and has a timing controller mounted thereon, wherein a gate control signal output from the main circuit unit is provided to the gate IC via the third flexible circuit unit.

7 Claims, 3 Drawing Sheets

10

X-ray DETECTOR

CROSS REFERENCE TO RELATED APPLICATIONS

This application is a National Stage Patent Application of PCT International Patent Application No. PCT/KR2022/021188 (filed on Dec. 23, 2022) under 35 U.S.C. § 371, which claims priority to Korean Patent Application No. 10-2021-0187564 (filed on Dec. 24, 2021), the teachings of which are incorporated herein in their entireties by reference.

TECHNICAL FIELD

The present disclosure relates to an X-ray detector.

BACKGROUND ART

An X-ray detector is used for medical or industrial purposes as a digital X-ray image sensor device.

Typically, the X-ray detector includes a sensor panel, gate ICs each mounted on flexible printed circuit boards (FPCBs) each connected to one side of the sensor panel, readout ICs each mounted on another FPCBs each connected to another side adjacent to the one side of the sensor panel, a gate circuit unit such as a PCB electrically connected to the gate ICs, and a readout circuit unit such as yet another PCB electrically connected to the readout ICs.

In the case of an X-ray detector that is used to detect defects in pipes as the industrial X-ray detector, the X-ray detector needs to be bent to match the round outer appearance of the pipe to prevent image distortion. When the X-ray detector is bent in this way, there may be a problem of damage to at least one of the gate circuit units or read out circuit units.

DISCLOSURE

Technical Problem

Accordingly, the present disclosure has been made keeping in mind the above problems occurring in the related art and aims to provide a way to prevent damage to circuit units even when an X-ray detector is bent.

Technical Solution

In order to accomplish the above objectives, there may be provided a X-ray detector including: a sensor panel having flexible characteristics; at least one first flexible circuit unit configured to be attached along a first edge of the sensor panel and have a gate IC mounted thereon; at least one second flexible circuit unit configured to be attached along a second edge of the sensor panel and have a readout IC mounted thereon; a third flexible circuit unit configured to be attached to one end of the first edge; and a main circuit unit configured to be connected to the third flexible circuit unit and have a timing controller mounted thereon, wherein a gate control signal output from the main circuit unit is provided to the gate IC via the third flexible circuit unit.

The sensor panel may include a first connection wire connecting the third flexible circuit unit and the first flexible circuit unit.

The sensor panel may be provided with a plurality of the first flexible circuit units each having the gate IC mounted thereon along the first edge, and the sensor panel may include second connection wires, the wire configured to electrically connect the gate ICs of the first flexible circuit units adjacent to each other.

The X-ray detector may further include a driving circuit unit configured to be connected between the second flexible circuit unit and the main circuit unit.

The X-ray detector may further include a first support board with flexible characteristics configured to support a rear side of the sensor panel.

The X-ray detector may further include a second support board having one surface configured to have the driving circuit unit placed thereon and an opposite surface configured to have the main circuit unit placed thereon.

The driving circuit unit and the main circuit unit may be located on one side of the second edge so as not to overlap the sensor panel in a planar manner.

Advantageous Effects

In the X-ray detector of the present disclosure, the main circuit unit and the gate ICs are configured to be electrically connected through the third flexible circuit unit so that the gate control signal can be transmitted, thereby allowing a circuit unit of the hard material for driving the gate IC to be eliminated.

Accordingly, when the sensor panel on which the gate ICs are disposed is bent along its length direction during an X-ray inspection, the X-ray detector may be bent without any damage to its components, as there is no separate circuit unit for driving the gate IC present in this direction.

BEST MODE

Hereinafter, embodiments of the present disclosure will be described in detail with reference to the drawings.

Figure 1:
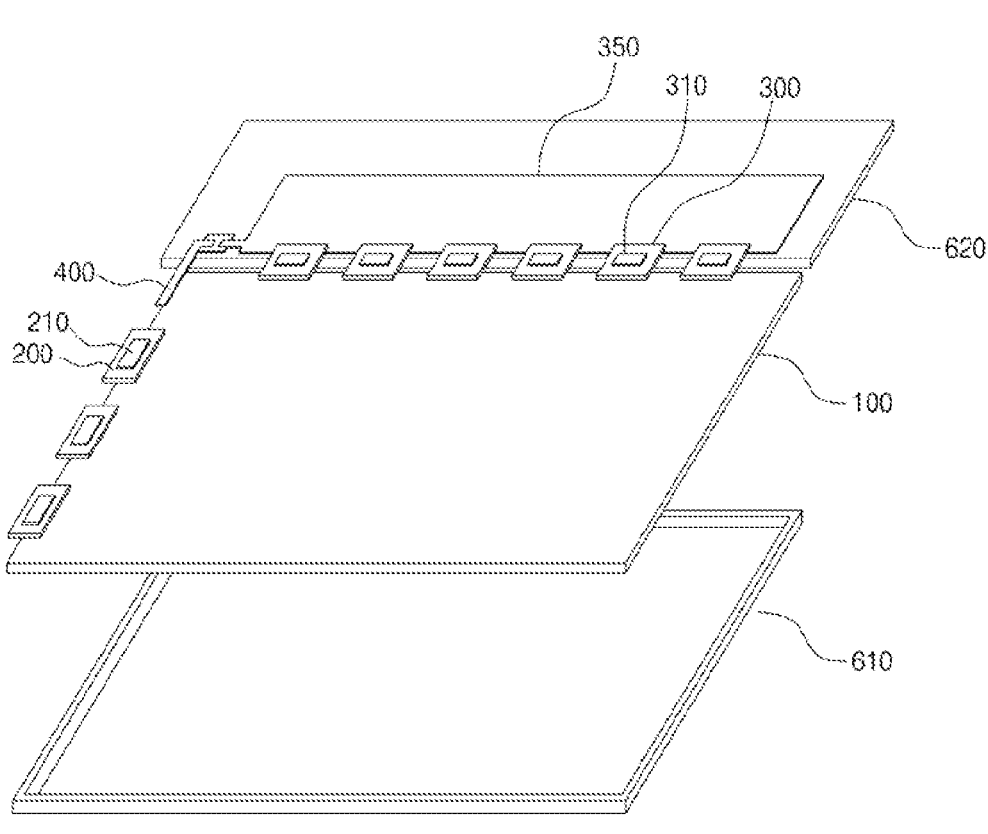
FIG. 1 is a perspective view schematically showing an X-ray detector according to an embodiment of the present disclosure.
Figure 2:
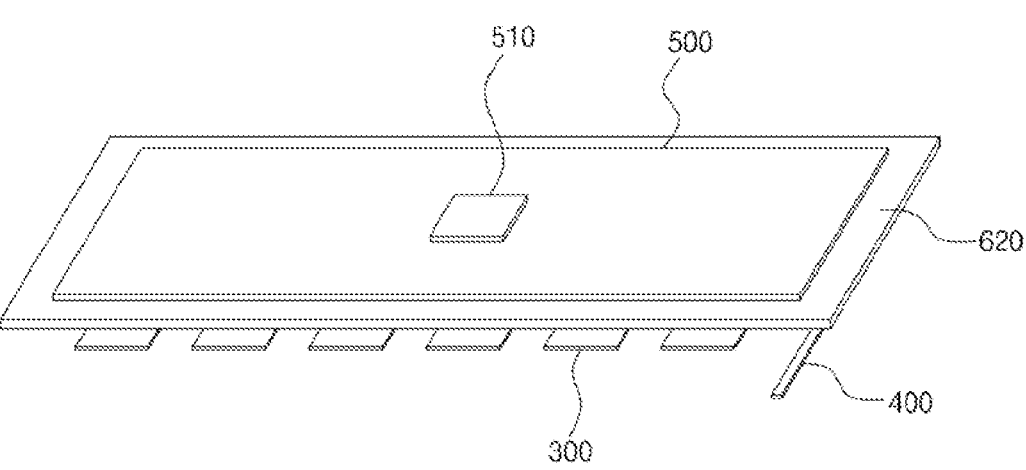
FIG. 2 is a perspective view schematically showing a main board, a second support board, and second and third flexible circuit units of the X-ray detector according to the embodiment of the present disclosure.
Figure 3:
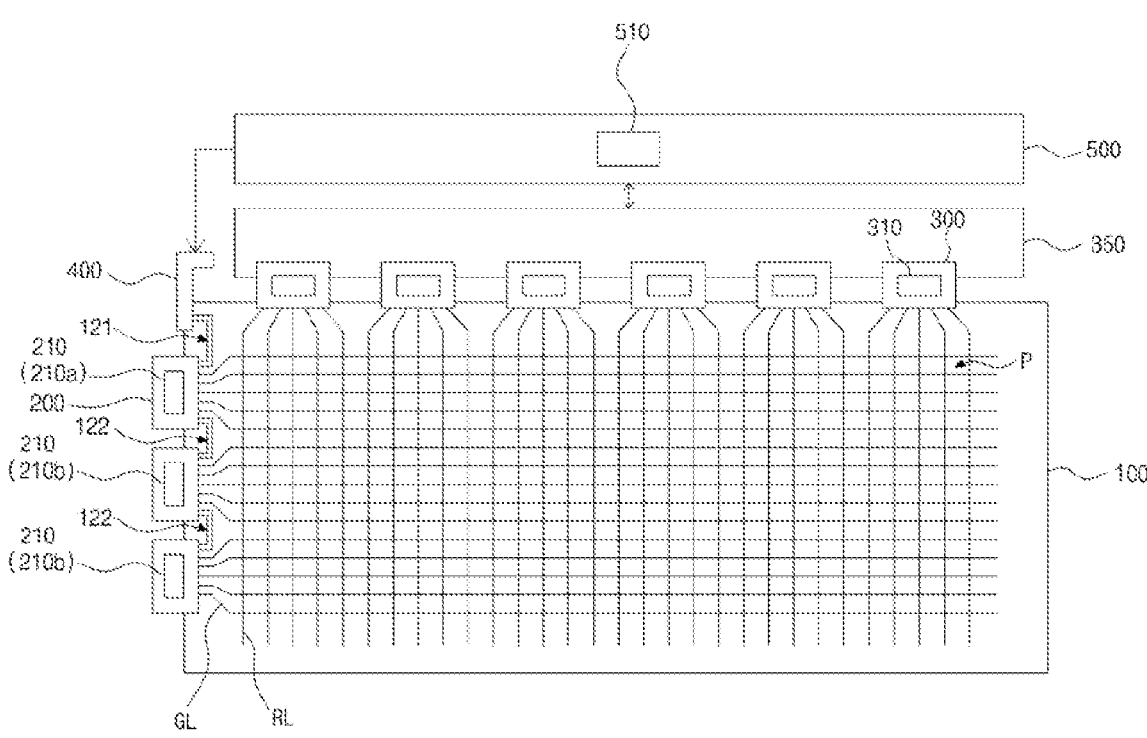
FIG. 3 is a block diagram schematically showing the X-ray detector according to the embodiment of the present disclosure.

FIG. 1 is a perspective view schematically showing an X-ray detector according to an embodiment of the present disclosure. In FIG. 1, some components of the X-ray detector are shown for convenience of explanation. FIG. 2 is a perspective view schematically showing a main board, a second support board, and second and third flexible circuit units of the X-ray detector according to the embodiment of the present disclosure. FIG. 3 is a block diagram schematically showing the X-ray detector according to the embodiment of the present disclosure.

With reference to FIGS. 1 to 3, the X-ray detector 10 according to the embodiment of the present disclosure may include a sensor panel 100, first flexible circuit units 200 configured to have gate ICs 210 respectively mounted thereon, second flexible circuit units 300 configured to have readout ICs 310 respectively mounted thereon, a third flexible circuit unit 400, a driving circuit unit 350, a main circuit unit 500, a first support board 610, and a second support board 620.

In the X-ray detector 10, at least one gate IC 210 may be used, but in the present embodiment, a case in which a plurality of gate ICs 210 and a plurality of first flexible circuit units 200 on which the plurality of gate ICs 210 is respectively mounted is used as an example. The first flexible circuit unit may be composed of an FPCB as an example. In addition, in the X-ray detector 10, at least one readout IC 310 may be used, but in the present embodiment, a case in which a plurality of readout ICs 310 and a plurality of second flexible circuit units 300 on which the plurality of readout ICs 310 is respectively mounted is used as an example. The second flexible circuit unit may be composed of an FPCB as an example.

The sensor panel 100 generates an electrical signal corresponding to the incident X-rays. In the sensor panel 100, pixels P which are unit elements that detect X-rays may be disposed in a matrix form. The sensor panel 100 may be a direct method that directly converts X-rays into electrical signals or an indirect method that converts X-rays into visible light and then converts them into electrical signals.

Meanwhile, when the sensor panel 100 is the indirect method, the X-ray detector 10 may further include a phosphor. This phosphor is disposed on the front surface of the sensor panel 100, where X-rays are incident, and may convert the incident X-rays into visible light.

A plurality of gate wires GL and a plurality of read out wires RL that cross each other may be provided in the sensor panel 100.

The plurality of gate wires GL may extend, for example, along a first direction (or row direction) and be connected to the pixels P disposed in the corresponding row line. In each frame, gate signals are sequentially applied to the plurality of gate wires GL from the plurality of gate ICs 210, and the gate signals may be transmitted to the pixels P of the corresponding row lines.

The plurality of read out lines RL may extend, for example, along a second direction (or column direction) and be connected to pixels P disposed in a corresponding column line. The read out wires RL may be applied with electrical signals generated from the pixels P of the corresponding column line, respectively, and the electrical signals may be transmitted to the corresponding readout IC 310.

The sensor panel 100 may be configured to have flexible characteristics. In this regard, for example, a substrate on which the sensor array elements of the sensor panel 100 are provided may be made of a material with flexible characteristics, such as plastic, or thin glass to have flexible characteristics.

First flexible circuit units 200 with gate ICs 210 respectively mounted thereon may be connected to an edge of one side of the sensor panel 100, for example, a first edge. One end of the corresponding gate wire GL is connected to the output terminal of the first flexible circuit unit 200, and the gate signal output from the gate IC 210 mounted on the first flexible circuit unit 200 may be applied to the gate wire GL.

In addition, on an edge of another side, which is adjacent to the first edge where the gate ICs 210 are disposed, of the sensor panel 100, for example on a second edge, the second flexible circuit units 300 with flexible characteristics, on which readout IC s 310 are respectively mounted, may be connected. One end of the corresponding read out wire RL is connected to the output terminal of the second flexible circuit unit 300, and the electrical signal of the pixel transmitted through the read out wire RL may be input to the readout IC 310 that is mounted on the corresponding second flexible circuit unit 300.

The driving circuit unit 350 corresponds to a circuit unit for driving the readout IC 310 and may be connected to the plurality of second flexible circuit units 300. The driving circuit unit 350 may be applied with the electrical signal output from the readout IC 310. In addition, the driving circuit unit 350 may output a read out control signal to the readout IC 310 to control the operation of the readout IC 310. Such a driving circuit unit 350 may be made of a PCB which is a hard material with the characteristic of not being substantially bent.

The third flexible circuit unit 400 having flexible characteristics may be connected to one end part of the first edge. In this connection, for example, the third flexible circuit unit 400 may be connected to one end part of the first edge located adjacent to the second edge. In other words, the third flexible circuit unit 400 may be attached to the first edge area between the corner that is located between the first and second edges and the area where the first flexible circuit unit 210 which is closest to the second edge is attached.

Through such a third flexible circuit unit 400, the main circuit unit 500 and the gate ICs 210 may be electrically connected. Accordingly, the gate control signals that control the driving of the gate ICs 210 may be output from the main circuit unit 500 and then transmitted to the gate ICs 210 through the third flexible circuit unit 400.

In this way, as the gate control signal is configured to be transmitted through the third flexible circuit unit 400 by electrically connecting the main circuit unit 500 and the gate ICs 210, a circuit unit for driving the gate ICs made of hard material may be eliminated.

Since, in this way, the circuit unit for driving the gate IC is not used, there is no circuit unit present to drive the gate IC that could be damaged when the X-ray detector 10 is bent, bending the sensor panel 100 along the longitudinal direction of the first edge. Accordingly, the X-ray detector 10 may be freely bent in the direction that the gate ICs 210 are attached.

Meanwhile, the electrical connection structure of the third flexible circuit unit 400 and the gate ICs 210 will be examined in more detail. Here, for convenience of explanation, for the plurality of gate ICs 210, the gate IC 210 closest to the third flexible circuit unit 400 is referred to as the first gate IC 210*a*, and the remaining gate ICs 210 are referred to as the second gate ICs 210*b*.

A space between the first flexible circuit unit 200, on which the first gate IC 210*a* is mounted, and the third flexible circuit unit 400 may be connected through a first connection wire 121 provided on the substrate of the sensor panel 100. Accordingly, the gate control signal output from the third flexible circuit unit 400 may be input to the first flexible circuit unit 200 via the first connection wire 121 and transmitted to the first gate IC 210*a*.

Similarly to the above, a space between the adjacent gate ICs 210 and, more specifically, a space between adjacent first flexible circuit units 200 may be connected through a second connection wire 122 provided on the substrate of the sensor panel 100. In this connection, for example, a space between the first flexible circuit unit 200, on which the first gate IC 210*a* is mounted, and the adjacent first flexible circuit unit 200, on which the second gate IC 210*b* is mounted, may be connected through the second connection wire 122 provided on the substrate of the sensor panel 100. Likewise, a space between one first flexible circuit unit 200, on which the second gate IC 210*b* is mounted, and another first flexible circuit unit 200, on which the second gate IC 210*b* is mounted and which is located at the rear end of, or adjacent to, the one first flexible circuit unit 200, may be connected through the second connection wire 122 provided on the substrate of the sensor panel 100. Accordingly, the gate control signal provided to the first flexible circuit unit 200, on which the first gate IC 210*a* is mounted, may be transmitted to the second gate IC 210*b* via the second connection wire 122.

The main circuit unit 500 is configured to output control signals that control the operation of the sensor panel 100, gate ICs 210, and readout IC s 310 and to also receive electrical signals output from the readout IC s 310. In this connection, a timing controller 510 is mounted on the main circuit unit 500, and the timing controller 510 may generate various control signals including a gate control signal and a read out control signal. The gate control signal may be output to the third flexible circuit unit 400 and provided to the gate ICs 210, and the read out control signal may be output to the driving circuit unit 350 and then provided to the readout IC s 310. Meanwhile, the electrical signal of the pixel output from the readout IC s 310 is provided to the main circuit unit 500 through the driving circuit unit 350 and may be signal processed in the timing controller 510.

A first support board 610 may be attached to the sensor panel 100. The first support board 610 may be made of a material with flexible characteristics. The first support board 610 may have the function of supporting and protecting the sensor panel 100. For example, the first support board 610 may cover (or shield) a rear surface of the sensor panel 100 and may further cover the side surfaces of the sensor panel 100.

Such a first support board 610 may be bent together with the sensor panel 100 and may maintain its shape by supporting the sensor panel 100 in a bent state.

The second support board 620 may have one surface with the driving circuit unit 350 placed thereon and an opposite surface with the main circuit unit 500 placed thereon. For example, the driving circuit unit 350 may be attached to a front surface of the second support board 620, and the main circuit unit 500 may be attached to a rear surface of the second support board 620.

Meanwhile, within the X-ray detector 10, the second support board 620 may be disposed so as not to overlap the sensor panel 100 in a planar manner. In other words, the driving circuit unit 350 and the main circuit unit 500 may be disposed so as not to overlap the sensor panel 100 in the planar manner. In this connection, the industrial X-ray detector 10 may have in a flat configuration an X-ray detection area, where the sensor panel 100 is located, and a peripheral area, as one side of the X-ray detection area, where a handle is provided, on one side of the second edge of the sensor panel 100. Here, the driving circuit unit 350 and the main circuit unit 500 may be disposed in this peripheral area.

In such a case, when performing an X-ray inspection, the X-ray detection area may be bent according to the outer appearance of the inspection object, and the peripheral area where the handle is provided may not be bent and may maintain a substantially flat state.

In this way, when the X-ray detection area is bent during X-ray inspection, the bending direction is the longitudinal direction of the first edge of the sensor panel 100 where the gate ICs 210 are disposed, and there is no separate circuit unit for driving the gate IC present in this direction. Accordingly, the X-ray detector 10 may be bent without any damage to its components.

The invention claimed is:

1. An X-ray detector comprising:

a sensor panel configured to be flexible;

at least one first flexible circuit unit configured to be attached along a first edge of the sensor panel and have a gate IC mounted thereon;

at least one second flexible circuit unit configured to be attached along a second edge of the sensor panel and have a readout IC mounted thereon;

a third flexible circuit unit configured to be attached to one end of the first edge; and a main circuit unit configured to be connected to the third flexible circuit unit and have a timing controller mounted thereon, wherein a gate control signal output from the main circuit unit is provided to the gate IC via the third flexible circuit unit.

2. The X-ray detector of claim 1, wherein the sensor panel comprises a first connection wire connecting the third flexible circuit unit and the first flexible circuit unit.

3. The X-ray detector of claim 1, wherein the sensor panel is provided with a plurality of the first flexible circuit units each having the gate IC mounted thereon along the first edge, and the sensor panel includes second connection wires, the wire configured to electrically connect the gate ICs of the first flexible circuit units adjacent to each other.

4. The X-ray detector of claim 1, further comprising:

a driving circuit unit configured to be connected between the second flexible circuit unit and the main circuit unit.

5. The X-ray detector of claim 4, further comprising:

a first support board with flexible characteristics configured to support a rear side of the sensor panel.

6. The X-ray detector of claim 4, further comprising:

a second support board having one surface configured to have the driving circuit unit placed thereon and an opposite surface configured to have the main circuit unit placed thereon.

7. The X-ray detector of claim 4, wherein the driving circuit unit and the main circuit unit are located on one side of the second edge so as not to overlap the sensor panel in a planar manner.

* * * * *